United States Patent
Dickson, Jr. et al.

(10) Patent No.: US 7,207,506 B1
(45) Date of Patent: *Apr. 24, 2007

(54) BLENDING STATION APPARATUS AND METHOD

(75) Inventors: Thomas D. Dickson, Jr., Highland, UT (US); B. Shawn Elgaaen, Provo, UT (US); Ralph W. Schwarze, Los Altos Hills, CA (US); David J. Throckmorton, Highland, UT (US)

(73) Assignee: K-TEC, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/314,069

(22) Filed: Dec. 21, 2005

Related U.S. Application Data (63) Continuation of application No. 10/877,412, filed on Jun. 25, 2004, now Pat. No. 7,048,217, which is a continuation of application No. 09/667,284, filed on Sep. 22, 2000, now abandoned.

(51) Int. Cl.
*B02C 19/12* (2006.01)

(52) U.S. Cl. ........................ 241/21; 99/275; 241/260.1; 241/DIG. 17

(58) Field of Classification Search ............... 241/21, 241/101.2, 260.1, 30, DIG. 17; 99/275, 99/300, 290, 348; 366/318
See application file for complete search history.

(56) References Cited

U.S. PATENT DOCUMENTS

| | | | |
|---|---|---|---|
| 3,358,609 A | 12/1967 | Worth et al. |
| 3,837,587 A | 9/1974 | Walter et al. |
| 4,039,693 A | 8/1977 | Adams et al. |
| 4,653,281 A | 3/1987 | Van Der Veer |
| 4,681,030 A | 7/1987 | Herbert |
| 4,745,773 A | 5/1988 | Ando |
| 4,786,002 A | 11/1988 | Mitsubayashi et al. |
| 4,919,075 A | 4/1990 | Himi |
| D310,932 S | 10/1990 | Mitsubayashi |
| D311,658 S | 10/1990 | Mitsubayashi |
| 5,095,710 A | 3/1992 | Black et al. |
| 5,273,219 A | 12/1993 | Beach et al. |
| 5,323,691 A | 6/1994 | Reese et al. |
| D367,797 S | 3/1996 | Hauser, II et al. |
| D373,280 S | 9/1996 | Johnson |
| 5,603,229 A | 2/1997 | Cocchi et al. |
| 5,619,901 A | 4/1997 | Reese |
| 5,706,661 A | 1/1998 | Frank |
| 5,709,095 A | 1/1998 | Johnson |

(Continued)

OTHER PUBLICATIONS

Internet advertisement from island Oasis for "The SB3X Ice-Shaver Blender," dated Jul. 15, 1999.

*Primary Examiner*—Mark Rosenbaum
(74) *Attorney, Agent, or Firm*—Holland & Hart (57) ABSTRACT

A blending station apparatus and method includes a foodstuffs storage location where a plurality of individual foodstuffs storage containers are held, a control panel for inputting information into the blending station so that the beverage size and one or more of the various types of foodstuffs, as well as other ingredients such as ice, water, supplements, etc., can be selected to make a drink, a blending container to hold the various ingredients, a mixing location for blending the ingredients to achieve a uniform drink consistency, and a cleaning location to clean the blending container after the blended contents have been dispensed into a container for consumption.

26 Claims, 10 Drawing Sheets

U.S. PATENT DOCUMENTS

| | | |
|---|---|---|
| 5,732,856 A | 3/1998 | Fry |
| 5,778,761 A | 7/1998 | Miller |
| 5,960,701 A | 10/1999 | Reese |
| 6,126,983 A * | 10/2000 | Miller ........................ 426/565 |
| D436,789 S | 1/2001 | Dickson, Jr. |
| 6,173,458 B1 | 1/2001 | Maddux |
| 6,326,047 B1 | 12/2001 | Farrell |
| 6,449,970 B1 | 9/2002 | Gagliano |
| 6,536,224 B2 | 3/2003 | Frank |
| 6,772,675 B2 | 8/2004 | Ervin |
| 6,811,303 B2 | 11/2004 | Dickson, Jr. |

* cited by examiner

BLENDING STATION APPARATUS AND METHOD

RELATED APPLICATION

This is a continuation of U.S. patent application Ser. No. 10/877,412 filed on 25 Jun. 2004, now U.S. Pat. No. 7,048,217 which is a continuation of U.S. patent application Ser. No. 09/667,284, filed 22 Sep. 2000, now abandoned.

TECHNICAL FIELD

This invention relates to machines and methods for processing foodstuffs, and more particularly to blending machines, blending stations, and blending methods used to prepare beverages for consumption by the purchasing public.

BACKGROUND OF THE INVENTION

The popularity of food processors or blending machines, particularly in the beverage industry, has soared in recent times. People are beginning to appreciate the taste and quality of a well-processed beverage. Blended fruit smoothies and similar fruit drinks, popular with all types of people ranging from fitness fanatics to the less active, require a food processor or blending machine. Cold beverages, in particular, which utilize fruit (frozen or fresh) and ice to prepare present unique challenges in beverage preparation. An appropriate blending machine will break down the ice, fruit, and other ingredients in attempting to achieve an ideal uniform drink consistency. In addition, food processors or blending machines are ideal for mixing nutritional supplements into beverages while similarly attempting to achieve an ideal uniform drink consistency.

In addition to the smoothie craze which has swept the nation, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie shops and other retail stores. The keys to producing a high quality beverage, irrespective of the specific type of beverage, are quality ingredients and a high quality blending machine that will quickly and efficiently blend the ingredients to produce a drink with uniform consistency.

One problem associated with businesses that depend on blending machines is the speed with which the beverage or drink is prepared. In the food preparation industry, time equals money. Traditional beverages are made by retrieving a clean blending container, adding nutritional supplements, adding liquid ingredients (e.g., juices and water), adding fruit, adding ice cream, sorbet, sherbet, yogurt, or another similar ingredient, and adding ice. Thereafter, the blending container is covered and placed upon a motor which rotates a blade rotatably and integrally mounted within the blending container to process the foodstuffs and ingredients in an attempt to achieve the desired uniform drink consistency. Thereafter, the blending container is removed from the motor, the lid is removed from the top of the blending container, and the worker pours a blended beverage from the blending container into a beverage receptacle. Where an enclosure is used for noise reduction purposes, the blending container and installed lid must first be removed from the enclosure before removing the lid and serving the beverage. As noted, traditional blending methods require many separate steps and are highly cumbersome. Traditional blending requires physically moving the blending container to different locations for adding the various ingredients to the blending container, and then to the processing area. Collectively, significant periods of time are wasted between stations and by the requirement of human interaction. If the retail store is busy, the worker may leave the blending container at a particular location for an extended period of time. All of these non-automated steps performed by the beverage preparer, consume collectively large amounts of time. Each second wasted translates over time into money lost.

Another problem associated with traditional food processors and blenders relates to cleaning the blending container after a beverage for public consumption has been prepared. Traditionally, the blending containers are moved into a cleaning area for ultimate cleaning by hand and later transferred to an area where the blending container, after hand cleaning, can be used to mix another drink. It is generally understood that leaving unclean food service equipment in ambient air for even short periods of time may result in the formation of bacteria. Where washing by hand is employed (as opposed to automatic machine washing at relatively higher water temperatures), delay in cleaning may create problems. In addition, as mentioned above, steps such as washing by hand take time. The location where the blending containers are cleaned is usually remote from the location where the beverages are poured into receptacles for providing to customers. Thus, time is required to manually move the blending container from the service area to the remote cleaning area, which again becomes significant over a period of time.

Still another problem associated with traditional mixing devices relates to the need for multiple workers to be positioned at the various locations required in traditional mixing. It is common to have multiple workers at multiple stations where multiple blending containers are shuttled between stations while drinks are being prepared. For obvious reasons, the manpower requirements associated with traditional commercial drink mixing is expensive.

Yet another problem associated with making traditional frozen desserts, soft-serve ice cream, milkshakes, and the like, is that the products sit for extended periods of time in convenience stores and other fast-serve retail locations and are not blended or mixed at the time the products are served. Accordingly, these products cannot maintain consistency with respect to the composition of the beverage or with respect to the flavor of the beverage. Prior machines for producing frozen desserts such as soft-serve ice cream, milkshakes, icees, and the like, typically work on the principle of providing a drum within the machine that is chilled. A diluted beverage mixture freezes to the drum and is scraped off in the mixing process. As the mixed beverage materials sit for extended periods of time, they tend to separate, further crystalize, and degenerate with respect to taste and composition consistency.

A further problem associated with traditional machines that serve chilled or partially frozen beverages, including without limitation soft-serve ice cream, shakes, icees, etc., is that the beverage mix typically comes in the form of a diluted beverage mixture. All of the water, concentrate, and other ingredients must be shipped together. This requires shipping, storing, and installing for service to customers through a machine additional quantities (in terms of volume and weight) of the diluted beverage mixture.

In view of the foregoing, there is a need to provide a blending station apparatus and method of blending that will allow beverages to be made quickly and efficiently minimizing the overall time required between ordering a beverage and serving the beverage to the customer. There is also a need to provide a blending station apparatus and blending method that will minimize human involvement during the preparation and blending process. There is a further need to provide a blending station apparatus where ice and the other beverage ingredients can be mixed immediately prior to serving a beverage for consumption to maintain the highest possible quality of flavor and drink consistency.

SUMMARY AND OBJECTS OF THE INVENTION

It is a primary object of the invention to provide an improved blending station apparatus that requires less time to prepare the beverage from the time it is ordered.

Another object of the present invention is to provide a method of blending a beverage that allows ice and the various beverage ingredients to be blended at the time the beverage is ordered to produce a beverage with an improved taste and texture consistency.

Another object of the present invention is to provide a self-contained blending station apparatus where all beverage preparation and processing steps take place.

Another object of the invention is to provide a single-location blending station that includes a plurality of foodstuffs storage compartments, a mixing location, and a cleaning location for cleaning a blending container used to prepare the beverage.

Still another object of the present invention is to provide a method of preparing a beverage at a single blending location where the necessary ice, water, and plurality of foodstuffs for beverage diversity are maintained, where the blending takes place, and where cleaning of the blending container takes place.

Yet another object of the invention is to provide a beverage blending station apparatus where all constituents necessary to produce a beverage are appropriately stored and provided automatically, when called upon, to produce a beverage at a single location.

Another object of the invention is to provide a blending station apparatus that provides a plurality of storage containers for different foodstuffs, each of which can be selected for automatic dispensing into a blending container to create many different flavors of beverages.

Another object of the present invention is to provide a blending station apparatus where water, ice, and a plurality of beverage flavors are added to a blending container automatically without moving the blending container to different locations.

Another object of the present invention is to provide a blending station apparatus where all preparation and processing steps may be achieved by one person at a single mixing location.

Yet another object of the present invention is to provide a blending station apparatus that minimizes human involvement.

Another object of the present invention is to provide a blending station apparatus where a plurality of foodstuffs supply sources are provided, which can be used individually or in any combination, at a single blending location.

Still another object of the present invention is to provide a blending station apparatus where all automated preparation, blending, and cleaning devices are incorporated into a single blending station apparatus.

Yet another object of the present invention is to provide a blending station apparatus where ice and any necessary water is mixed at the point-of-service of the beverage to allow for improved consistency with respect to taste and composition of the beverage.

Another object of the invention is to provide a blending station apparatus that senses the temperature of the water being added to the foodstuffs so that ice can be portioned according to the temperature of the water to achieve a desired mix of ice, water, and foodstuffs.

Still another object of the invention is to provide a blending station apparatus that may be operatively coupled to a cash register or other location where an order is taken so that the process of preparing a beverage can be initiated immediately upon inputting information into the cash register or other ordering machine to speed up the beverage preparation process.

The foregoing objects are achieved by a blending station apparatus and method according to the present invention. The blending station preferably comprises generally a foodstuffs storage location where a plurality of individual foodstuffs storage containers are held, a control panel for inputting information into the blending station so that the beverage size and one or more of the various types of foodstuffs, as well as other ingredients such as ice, water, supplements, etc., can be selected to make a drink, a blending container to hold the various ingredients, a mixing location for blending the ingredients to achieve a uniform drink consistency, and a cleaning location to clean the blending container after the blended contents have been dispensed into a container for consumption. With size and space being the only limiting factor, the blending station may contain as many storage compartments for different foodstuffs storage containers as desired. In one preferred embodiment, six different storage compartments are utilized. By automatically blending the ice and other beverage ingredients just prior to serving the beverage, the blending station apparatus allows for rapid production of beverages with an improved taste and composition consistency. Another benefit of the present invention is that the foodstuffs can be shipped as a concentrate where ice and any necessary water can be blended into the beverage at the serving location, as compared to the traditional diluted beverage mixture which is heavier and takes up more space.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

DETAILED DESCRIPTION OF THE INVENTION

Figure 1:
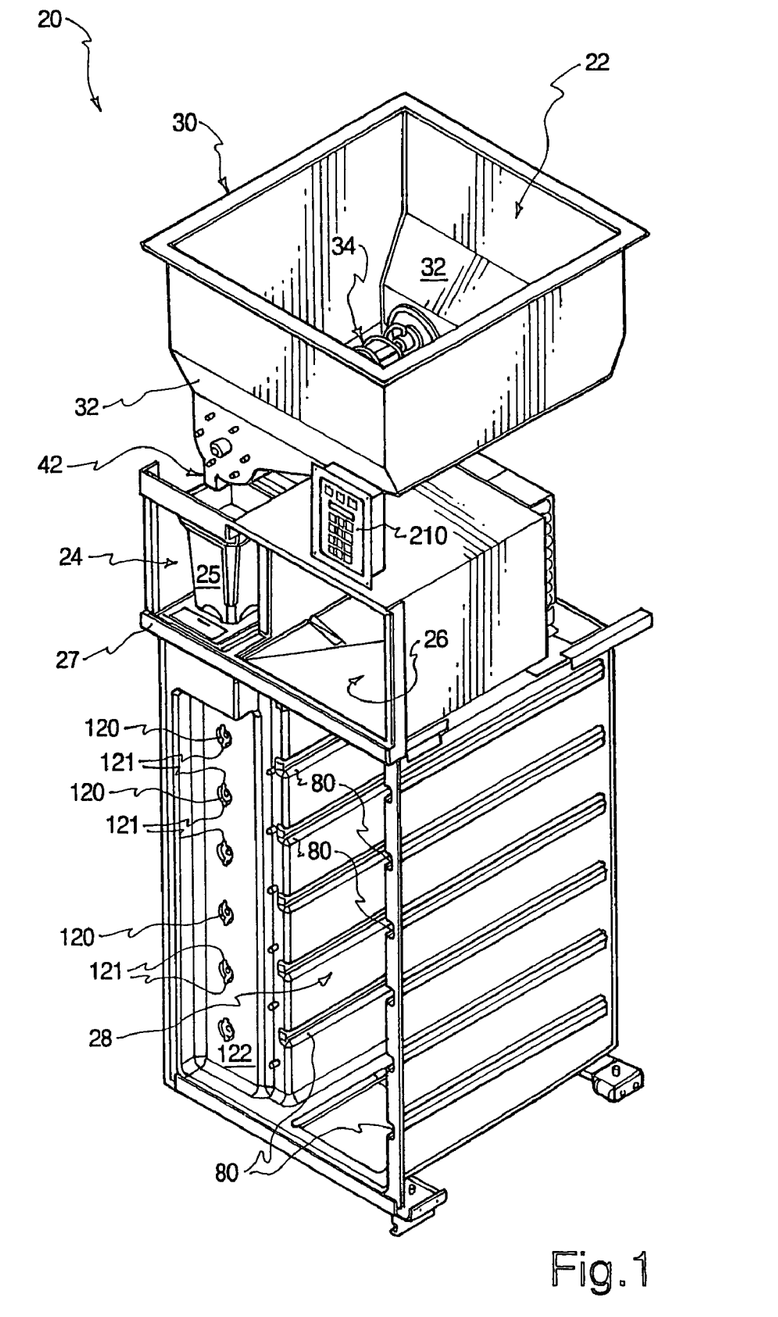
FIG. 1 is a partial perspective view of a blending station apparatus according to the present invention.

As shown in FIG. 1, the present invention relates to a blending station apparatus 20 which comprises generally an ice hopper area 22, a processing area 24, a beverage blending container or jar 25, a cleaning area 26, and a foodstuffs storage area 28. The blending station apparatus 20 is designed to provide all necessary ingredients (e.g., ice, water, and foodstuffs), equipment, and items necessary to prepare beverages, drinks, and the like at a single preparation and processing location. The term "beverage," for purposes of this disclosure, means any type of liquid foodstuffs, such as without limitation soft-serve foodstuffs, partially frozen foodstuffs, or other types of foodstuffs liquid. The term "foodstuffs," for purposes of this disclosure, means any type of ingredient or other materials added to the beverage mixture prior to blending except for ice and water.

The benefits of a blending station apparatus which is completely self contained are many. Time to prepare a beverage is reduced, human involvement is minimized, and the entire unit takes up relatively little spaced in a commercial facility, particularly as compared to traditional blending locations and methods. Additionally, frozen beverages, such as blended fruit smoothies, can be produced immediately after being ordered so the ice and other beverage ingredients are combined and blended together just before serving to produce a beverage with an improved taste and composition consistency.

It should be noted that FIG. 1 shows the blending station apparatus 20 without the typical side walls, doors, and covers that are utilized in connection with a preferred embodiment of the present invention. For example, a lid is preferably used to cover the ice storage or hopper area 22. A hinged door is preferably used to enclose the jar 25 within the processing area 24 for safety and other reasons. In fact, automatic processing may take place upon closing the door, as disclosed and claimed in U.S. Pat. No. 5,957,577, which is incorporated by this reference in its entirety. An insulated, hinged cabinet door is preferably used to cover foodstuffs storage area 20. Appropriate side walls are used on the front, sides, and back of the blending station apparatus. For improved aesthetics, the present invention is shown in the drawing without these conventional side walls, doors, etc., to facilitate explanation of the various aspects of the blending station apparatus and method.

The ice hopper area 22 more specifically comprises an ice hopper 30 sized to hold a sufficient amount of ice to run the blending station apparatus for a sustained period of time. In one embodiment, the ice hopper is capable of holding approximately 100 pounds of ice. The ice hopper 30 could be constructed so as to be associated with an automatic ice making machine (not shown). Alternatively, the ice hopper 30 may be filled manually on an as-needed basis. The ice hopper comprises inclined upper side walls 32 which funnel the ice toward the auger assembly 34.

Figure 2:
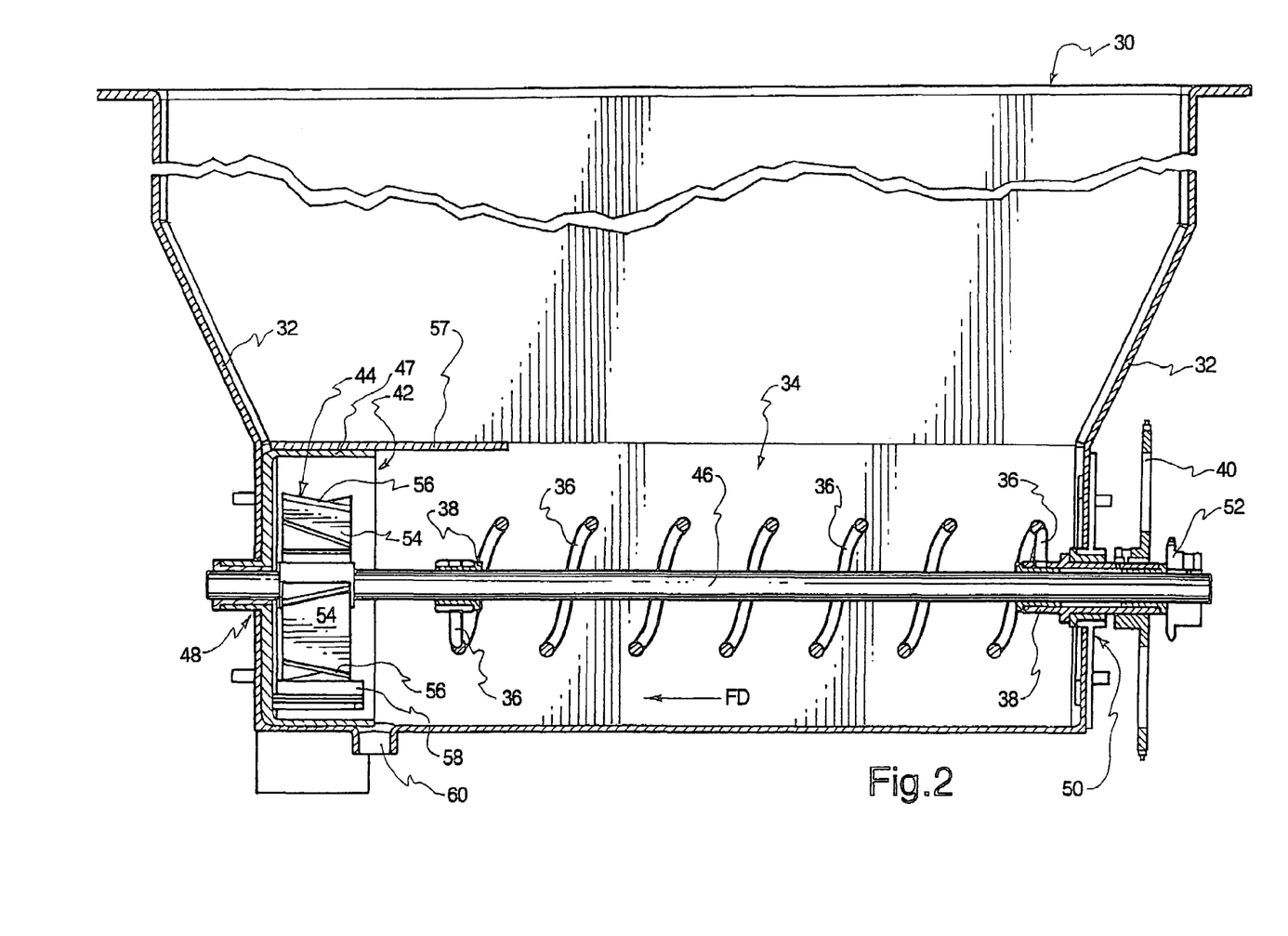
FIG. 2 is an enlarged partial right side elevation view, partly in section, of the ice hopper and ice auger assemblies utilized in connection with the blending station apparatus according to the present invention.

With reference to FIG. 2, the auger assembly 34 more specifically comprises a coil 36 coupled to an auger shaft 38 which is rotatably mounted, in turn, to one end of the hopper 30. An auger sprocket 40 is secured to the shaft 38 such that when a drive mechanism (not shown in FIG. 2), is operatively coupled to auger gear 40, the auger rotates to move the ice in a flow direction FD toward an ice chipper assembly 42, as shown in FIG. 2.

The ice chipper or crusher assembly 42 more specifically comprises an ice chipper head 44 which is coupled to an ice chipper shaft 46 which is rotatably secured to the ice hopper at mounting locations 48, 50. The chipper head 44 is rotatably mounted within a cylindrical ice chipper housing 47. The ice chipper shaft 46 is mounted for relative rotation within the auger shaft 38, and is driven by a chipper sprocket 52 secured to an end of the shaft 46 at an end opposite the chipper assembly 44.

Referring still to FIG. 2, the ice chipper head 44 of the ice chipper assembly 42 comprises a plurality of blades or paddles 54 having a plurality of edges 56. Preferably, the chipper head 44 comprises four (4) paddles. The paddles 54 and respective edges 56 push ice against a stationary blade 58 to reduce the ice, by crushing or chipping, to a desired size to facilitate precise portioning of the ice for blending purposes. A shroud 57 extends partially over the auger assembly 34 and channels the ice to be chipped toward the chipping head 44 at a constant rate. The resulting chipped or crushed ice passes through exit aperture 60 which extends directly above the blending container 25 (FIG. 1) for adding ice to the beverage being made. The ice chipper and auger operation is time controlled, depending on the size of the beverage being ordered.

As will be apparent given the size differences between the auger sprocket 40 and the ice chipper sprocket 52, which are driven by the same motor, the auger assembly 34 will rotate at a different speed as compared to the chipper assembly 42. For this reason, the ice chipper shaft 46 is rotatably mounted inside of the auger shaft 38 for relative rotation between the two shafts. The specific speeds may be adjusted by changing the diameter of the sprockets and can be set according to the desires of a person of ordinary skill in the art.

Figure 3:
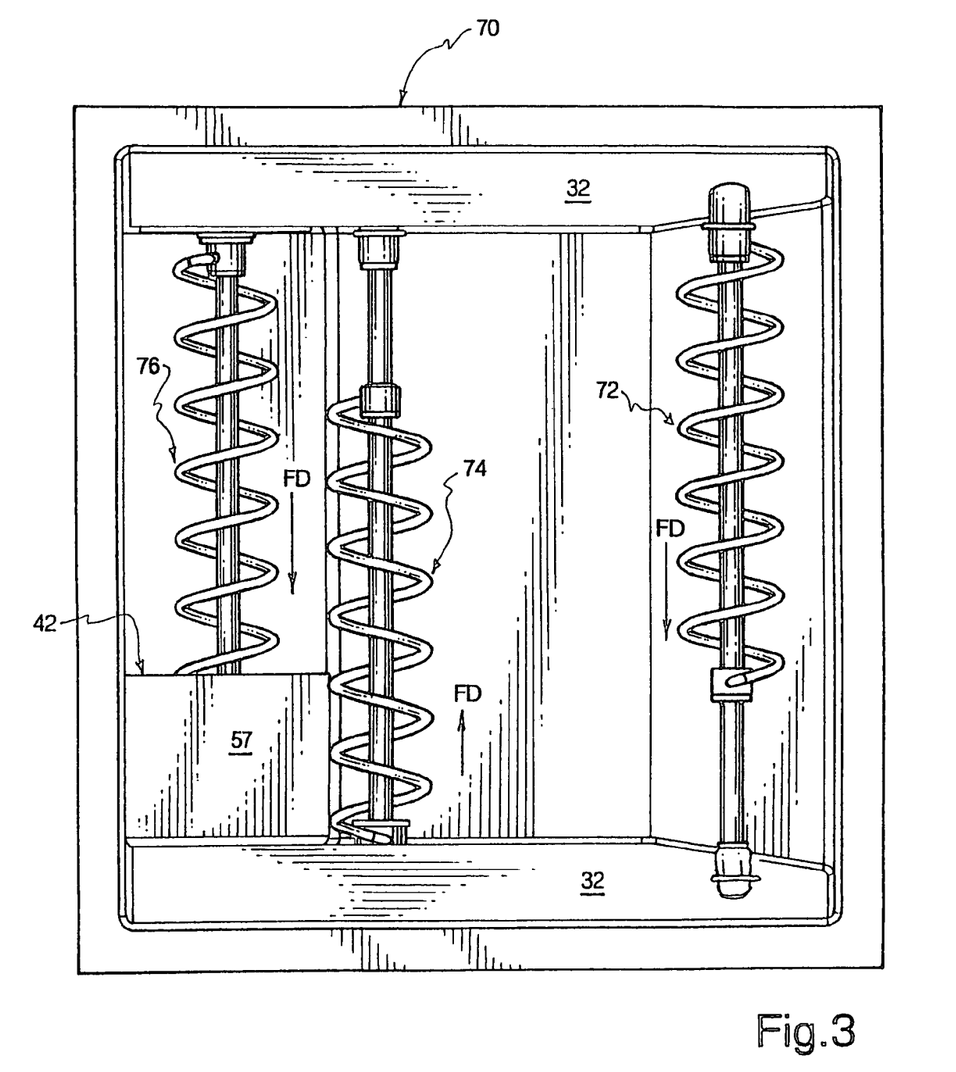
FIG. 3 is an enlarged top view of an alternative embodiment of the ice hopper and ice auger assemblies utilized in connection with the blending station apparatus according to the present invention.

An alternative embodiment of an ice hopper assembly 70 is shown in FIG. 3. The ice hopper assembly of this embodiment includes a first auger assembly 72, a second auger assembly 74, and a third auger assembly 76. Each auger assembly moves the ice within the hopper 70. As will be noted, the auger assemblies are oriented sequentially opposite one another. That is, auger assembly 72 will move ice in one flow direction FD (toward the top of FIG. 3) and auger assembly 74 will move the ice in an opposite flow direction FD. The auger assembly 76 will move the ice toward the ice chipper assembly 42 in the flow direction FD shown. The main purpose of the multiple ice augers is to maintain the flow of ice from the top of the ice hopper 70 continuously toward the bottom of the ice hopper 70 and ultimately to the ice chipper 42 so appropriate portioning of the ice can be achieved. In addition, the multiple ice augers maintain the ice in hopper 70 level for more even flow. Without multiple augers, it is possible for the ice to jam at the top of the ice hopper 70 and leave air pockets where no ice is present. By utilizing multiple augers, the ice is continually broken up and allowed to flow toward the bottom of the hopper 70 and toward the ice chipper assembly 42.

While any suitable conventional motor(s) may be used to drive the auger sprocket 40 and the chipper sprocket 52, a preferred embodiment of the present invention is configured such that a single drive motor 150 (FIG. 8) rotates all drive mechanisms. The details of this single drive motor design are discussed below.

Figure 4:
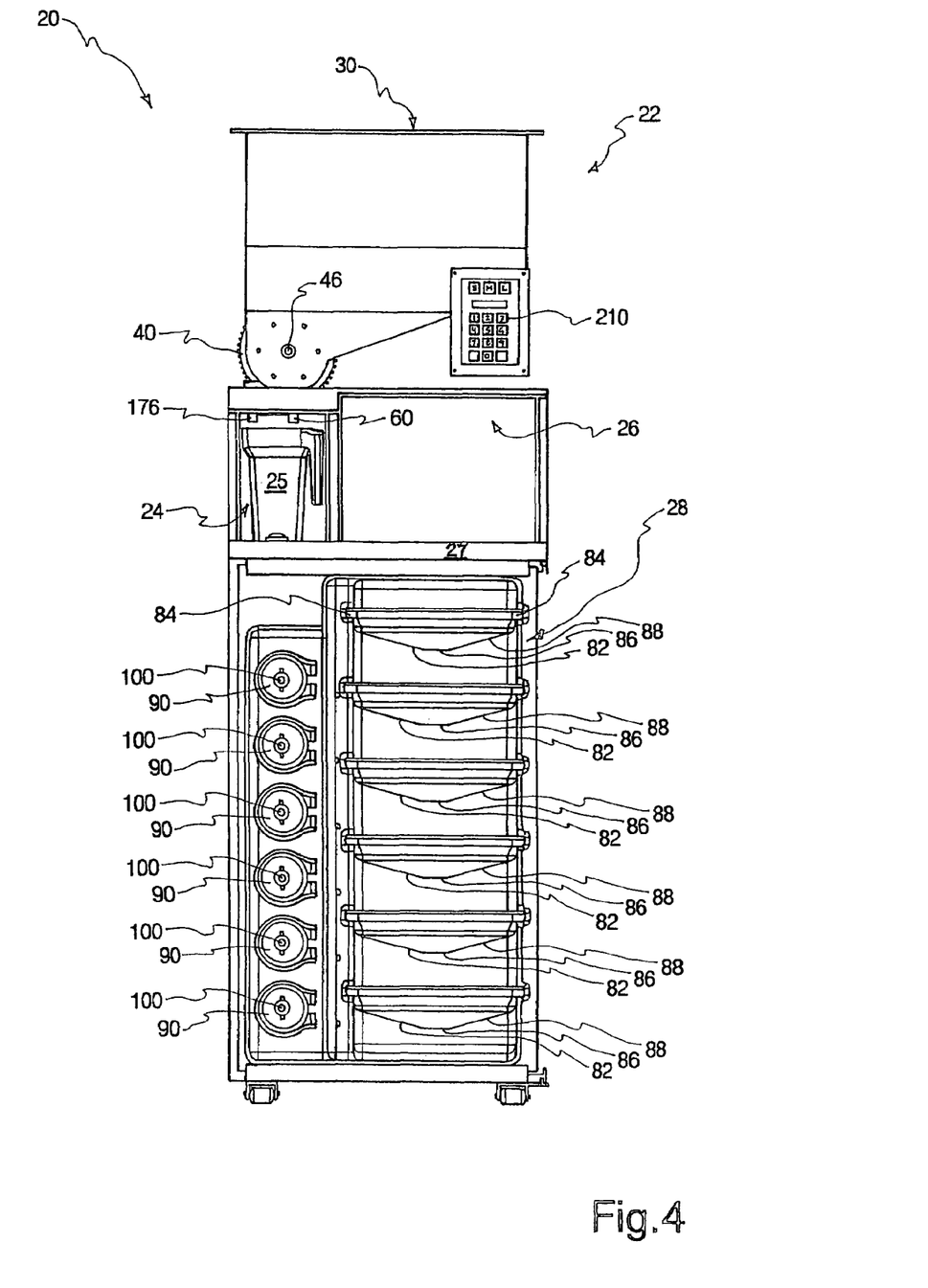
FIG. 4 is a partial front elevation view of a blending station apparatus according to the present invention.

With reference to FIGS. 1 and 4, the foodstuffs storage area 28 is shown. The storage compartment location 28 comprises a plurality of pairs of slots 80 (FIG. 1) formed in the side walls of a refrigerated cabinet and horizontally disposed relative to one another for receiving a plurality of trays 82 (FIG. 4) used to support foodstuffs storage containers (not shown in FIGS. 1 and 2). The trays 82 have opposed edges 84 which ride inside slots 80 so that the trays 82 can be slid into and retracted from the refrigerated cabinet of the storage compartment location area 28. At the bottom of each tray 82 is a central aperture 86 through which an access spout 134 (FIG. 6) from a foodstuffs storage container extends. Sloped walls 88 ensure that the liquid foodstuffs within the storage containers flows toward aperture 86 so that use of the foodstuffs held within the storage compartment containers is maximized.

Although not shown in the drawings, it will be understood by those skilled in the art that all standard refrigeration components, including without limitation a compressor, a thermostat, a run capacitor for the compressor motor, an evaporator, and a condenser, will be housed within the blending station apparatus 20 to cool the refrigerated cabinet corresponding to the foodstuffs storage compartment location 28.

One preferred embodiment includes six storage compartment trays 82 for holding six different types of foodstuffs storage containers. Those skilled in the art will understand, however, that the blending station apparatus 20 may be modified to include as many or as few storage compartment container racks or trays 82 as desired without departing from the scope of the present invention.

Figure 5:
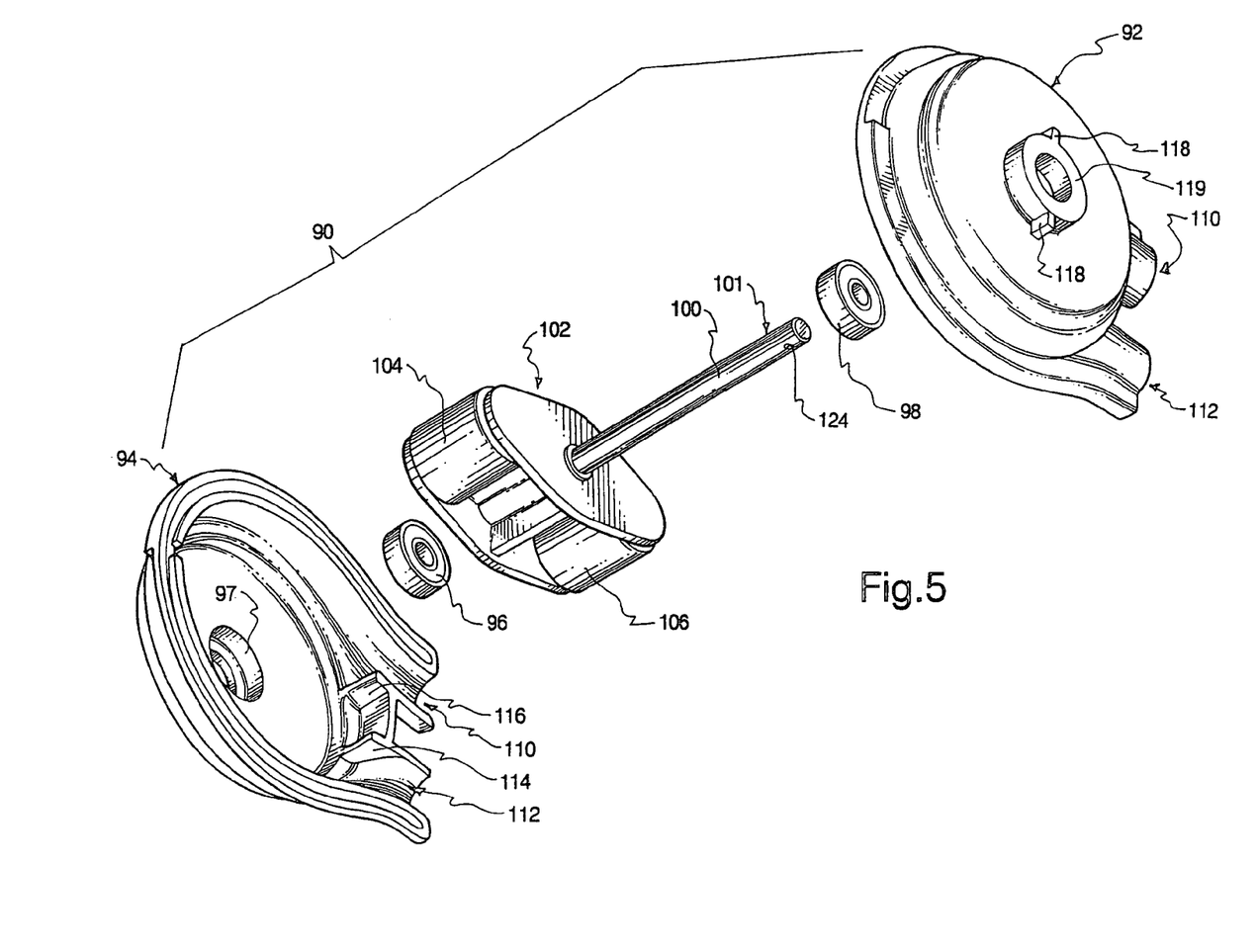
FIG. 5 is an enlarged exploded perspective view of a peristaltic pump utilized in connection with the blending station apparatus according to the present invention.
Figure 6:
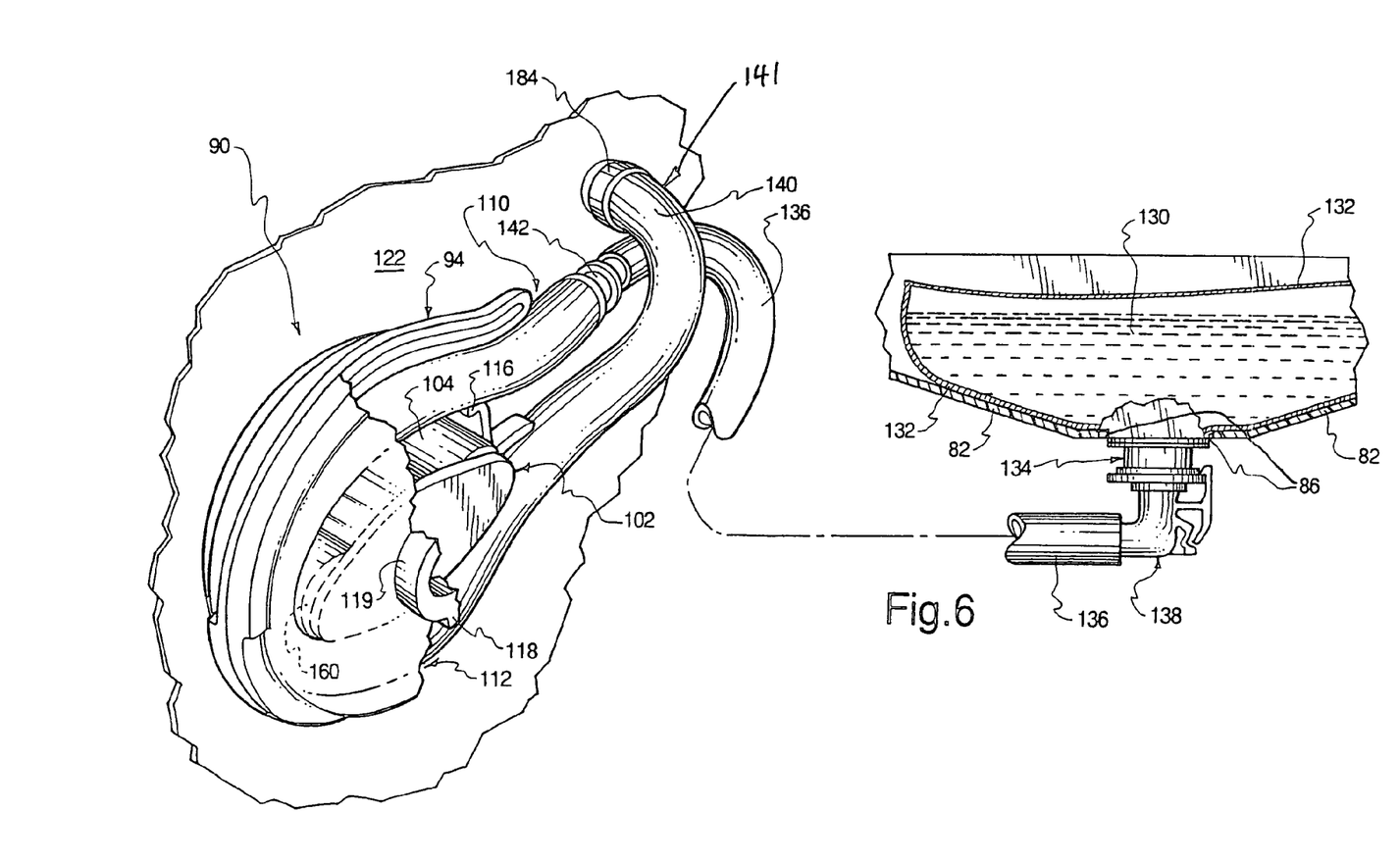
FIG. 6 is an enlarged partial perspective view of a peristaltic pump and associated foodstuffs storage container, partly in section, utilized in connection with the blending station apparatus according to the present invention.

Foodstuffs from any one of the storage containers (none shown in FIGS. 1 and 2) are propelled toward the blending container 25 by a plurality of associated peristaltic pumps 90, as shown in FIGS. 5 and 6. The peristaltic pump 90 comprises a first pump housing half 92 and a second pump housing half 94. As can be seen, the first housing half 92 and the second housing half 94 are identical mating halves with respect to each other. This facilitates manufacturing of the pump housing and reduces manufacturing costs. The two pump housing halves 92, 94 are made of a plastic material, and are preferably assembled by ultrasonic welding. A first sealed bearing or bushing 96 is inserted into a correspondingly sized aperture 97 formed in the second pump housing. A second bushing or bearing 98 is placed inside of a similarly corresponding cavity (not shown) in the first pump housing half 92. A shaft 100 and attached roller assembly 102 are mounted within the housing halves 92, 94 by positioning shaft 100 within the sealed bearings 96, 98. Thereafter, the pump housing halves 92, 94 assembly are secured together.

The roller assembly 102 more specifically comprises a first roller 104 and a second roller 106, oppositely mounted with respect to roller 104. The shaft 100 is selectively engaged by a clutch 146 and associated gear 144 (FIG. 7), which causes the roller assembly 102 to rotate. Details of the pump drive mechanisms are explained below. Upon feeding an appropriately sized food grade elastomeric tube 140 into the inlet port 110 of the pump 90, the tube 140 is engaged by one of the rollers 104, 106, and rotated around the peripheral interior of the pump housing until the end of the tube 140 is adjacent to the outlet aperture 112. A flange 114 (FIG. 5) catches the end of the tube 140 and directs the tube to the exterior of outlet aperture 112 of the pump 90.

The pump assembly 92 further comprises opposed interlocking flanges 118 extending from a raised bushing area 119, the combination of which is configured to nest inside of one of the recesses 120 (FIG. 1) formed in a wall 122 of the refrigerated cabinet of the blending station apparatus 20. Each recess 120 includes notches 121 which correspond to the flanges 118 formed in the pump housing so that each of the pumps 90 nest inside recesses 120 to prevent rotation of the pumps 90 relative to wall 122 when in operation.

FIG. 6 shows more specifically the operation of the peristaltic pump 90. A supply of foodstuffs 130 is held within a collapsible storage bag 132 placed inside of the slidable support tray 82. Rather than a diluted beverage mix, the foodstuffs 130 preferably comprises chilled concentrate to which ice and/or water is added to create a beverage with an improved consistency at the time the beverage is served. The collapsible storage bag 132 is taken from the bag-in-the-box technology typically associated with carbonated beverages, except the box has been removed. Accordingly, the bag or container 132 is flexible and will collapse as foodstuffs 130 is removed from the interior of the container 132. Those skilled in the art will understand that, while a preferred embodiment of the present invention discloses a peristaltic pump for introducing foodstuffs into the blending container 25, other suitable pumps and delivery systems may be utilized without departing from the scope of the present invention.

The storage container includes a conventional bag-in-a-box outlet end 134 through which the foodstuffs passes. The storage container is positioned inside the storage tray 82 such that the outlet end 134 of the storage bag 132 extends through aperture 86 formed in the tray 82. A supply tube 136 is operatively coupled to the storage bag 132 by a novel clasp mechanism 138, which appropriately seals with outlet end 132 when installed, yet allows for a quick disconnect of the storage bag 132 when it needs to be replaced. The clasp 138 is preferably made of synthetic material so all hinges have a memory to return the structure to its unstressed condition (as shown in FIG. 6) when the clasp is released. Those skilled in the art will understand that other suitable clasps or clips may be used to operatively connect the supply tube 136 with the storage bag 132 without departing from the scope of the present invention.

Figure 9:
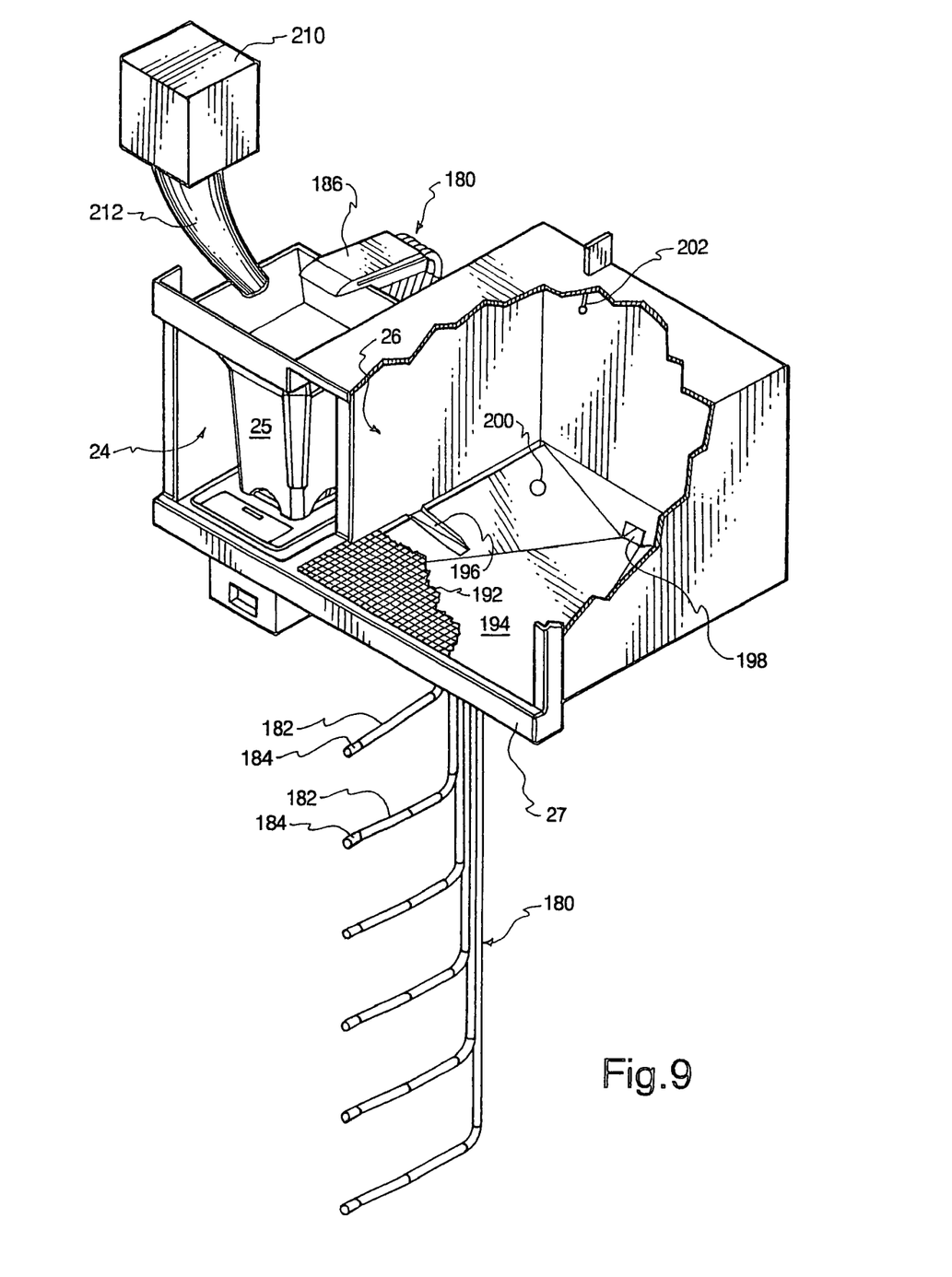
FIG. 9 is a perspective view of an array of foodstuffs supply tubes, the processing location, and the cleaning location utilized in connection with the blending station apparatus according to the present invention.

A replaceable tube section 140 is coupled to the supply tube 136 by a union member 142 which includes male extensions or barbed ends which extend into and seal with the respective ends of tubes 136, 140. As shown in FIG. 9, the roller assembly rotates to sequentially compress the tube 140 and its inner contents to create peristaltic action which draws foodstuffs 130 from the storage container 132 (FIG. 6). Tube 140 has an outlet end 141 which ultimately leads to a supply tube fitting 184 (also shown in FIG. 9) for automatically supplying the foodstuffs 130 to the blending container 25 when selected to prepare a desired beverage.

Figure 8:
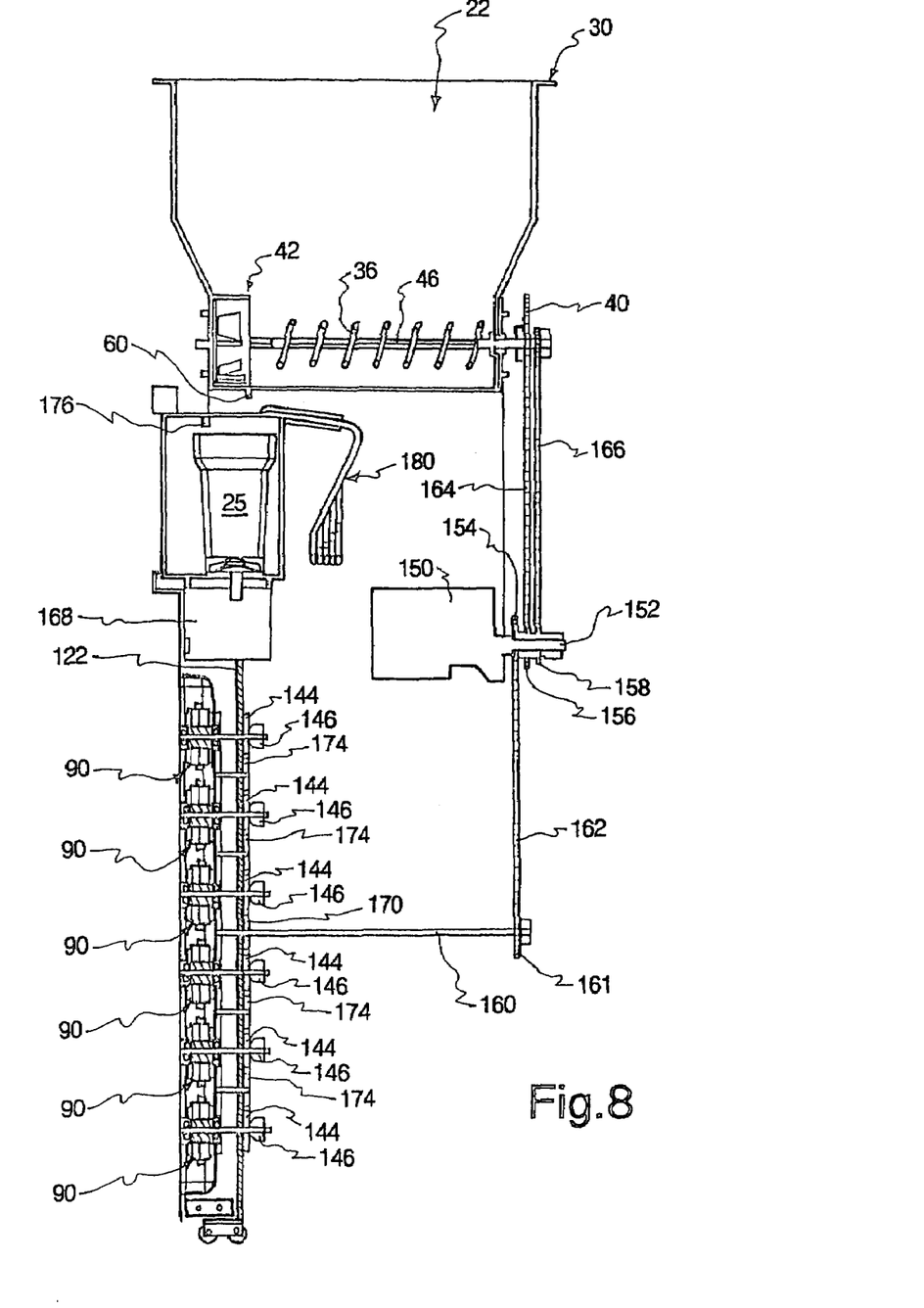
FIG. 8 is a partial right side elevation view of the drive mechanisms utilized in connection with the blending station apparatus according to the present invention.

A unique aspect of the present invention is that the tube section 140 is easily replaced when worn or otherwise ready for removal. With reference to FIGS. 8 and 9, a worn out tube 140 is first removed from the pump assembly by disconnecting from the fitting 184 and union 142 and allowing the pump to operate. The roller assembly will move the tube 140 out of the pump housing. Thereafter, a lead end of a replacement section of tube 140 is inserted into the inlet end 110 until one of the rollers 104, 106 engages the lead end of the replacement section of tube 140, which is then drawn or walked around the entire roller assembly 102 and inside the inner periphery of the pump housing. To prevent the new tube 140 from winding around a second time onto itself, and to ensure that the lead end passes through outlet opening 112, the guide flange 114 (see FIG. 8) is provided to catch the lead end of the tube 140 and direct the tube through outlet end 112 of the pump 90. It should be noted that a second flange 116 (FIG. 5) is provided, but such a flange is included only to make the two parts identical, mating parts for ease of manufacturing purposes. The self-feeding feature of present invention greatly speeds the time required to change tube 140, and thus reduces the down time of the blending station apparatus.

Figure 7:
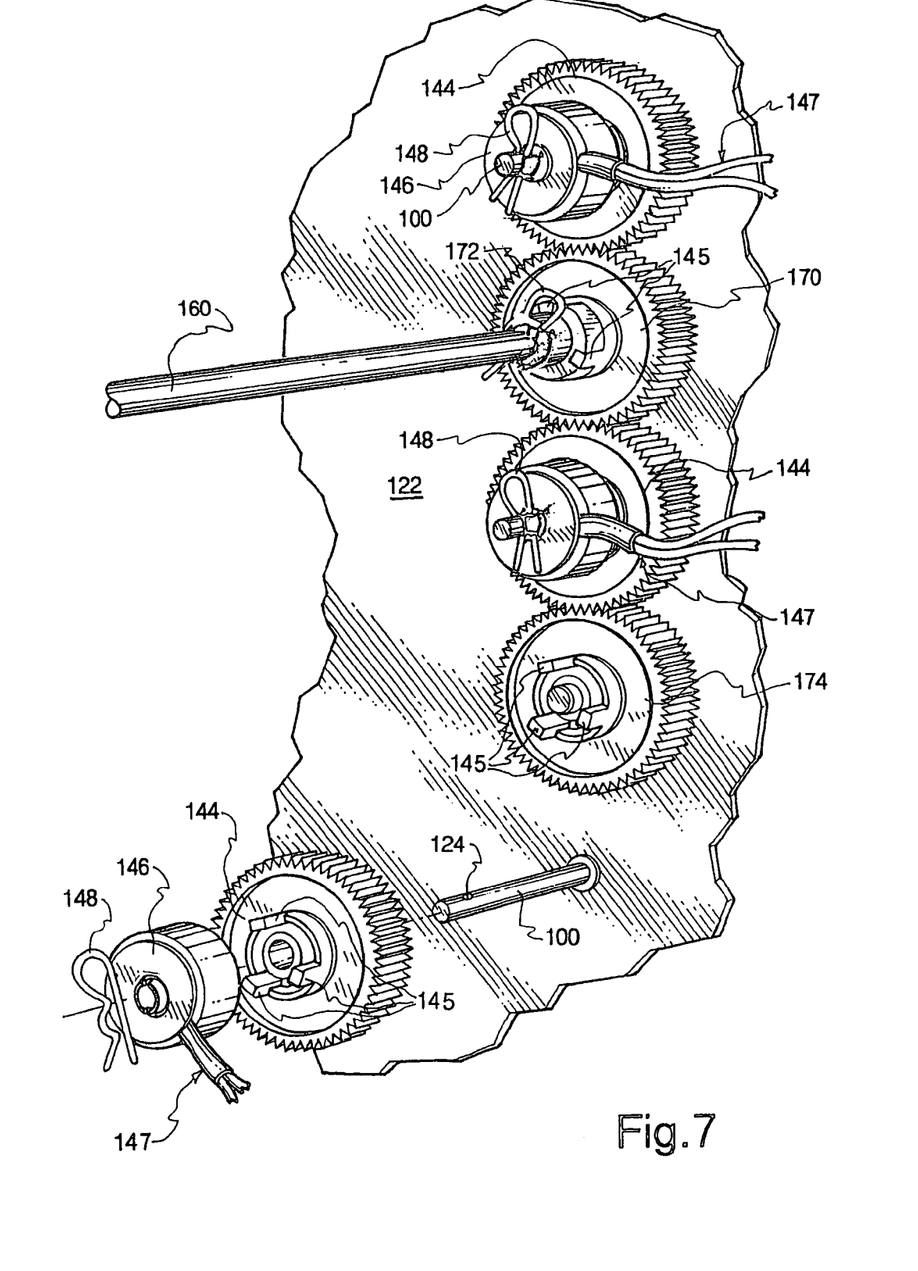
FIG. 7 is a perspective view of the drive gears for the various peristaltic pumps (not shown in FIG. 7) and the main jack shaft used to rotate all of the pump drive gears.

Another novel aspect of the present invention relates to the assembly and quick disconnect feature of each of the drive mechanisms for the pumps 90. Each pump assembly comprises a unique single-pin securing system used to couple the pump 92 to the wall 122 of the blending station apparatus 20. As shown in FIG. 7, each pump shaft 100 includes and extended distal end 101 which extends through wall 122 of the refrigerated cabinet and receives a gear 144 followed by a clutch 146 to selectively engage the lugs or cogs 145 on the gear 144 depending upon the beverage selected to be made by the blending station apparatus. The clutch mechanism 146 is a small electric clutch and is similar to the type of clutches used for conventional photocopy machines. Any type of suitable electric clutch may be used for clutch assembly 146. Lead wires 147 operatively couple the clutch assembly 146 with a power source and an information processor associated with the blending station apparatus.

To secure the entire pump 90, gear 144, and clutch 146 to the wall 122 of the refrigerated cabinet, an aperture 124 is provided on the distal end 101 of the pump shaft 100. A single pin 148 is removably inserted into aperture 124 to secure all pump, gear sprocket, and clutch components in an operable condition relative to one another at the particular location on wall 122. The single-pin connection allows the pumps, as well as the gears and clutches, to be easily and quickly removed, replaced, and/or serviced.

FIG. 8 shows the details of the various drive mechanisms associated with the blending station apparatus of the present invention. More specifically, an electric motor 150 includes a drive shaft 152 to which a first drive sprocket 154, a second drive sprocket 156, and a third drive sprocket 158 are attached. The first drive sprocket 154 is operatively coupled to a sprocket 161 on a jack shaft 160 by a first chain 162. The second drive sprocket 156 is operatively coupled to the auger sprocket 40 (see FIG. 2) by a second drive chain 164. The third drive sprocket 158 is operatively coupled to the ice chipper drive sprocket 52 (see FIG. 2) by a third drive chain 166. Given the differences in diameter of the auger drive sprocket 40 as compared to the ice chipper drive sprocket 52 (as shown in FIG. 2), the motor 150 will rotate the two shafts at different speeds, as desired.

Figure 12:
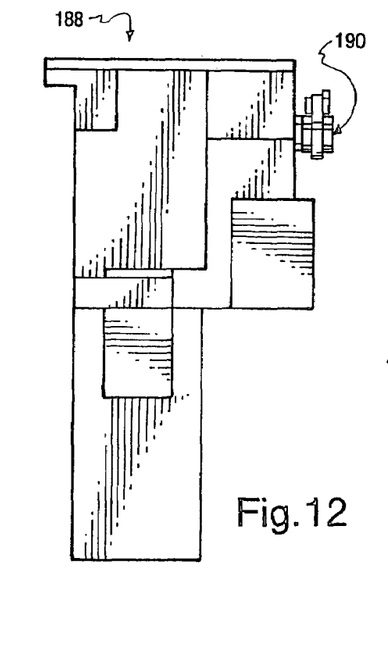
FIG. 12 is a right side elevation view of the recirculating refrigeration system duct of FIG. 10.
Figure 13:
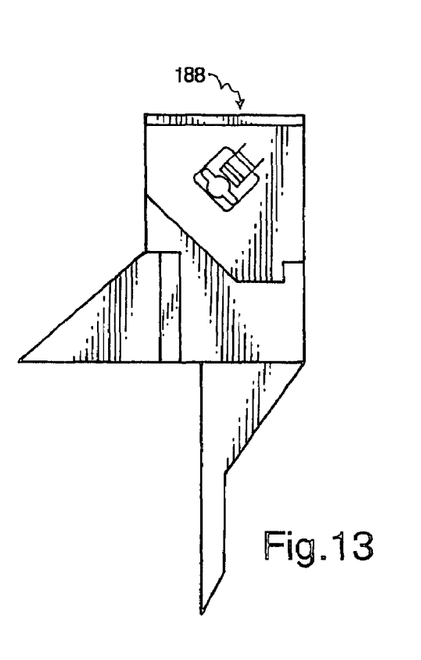
FIG. 13 is a rear view of the recirculating refrigeration system duct of FIG. 10.

With reference to FIGS. 7 and 8, the drive mechanisms associated with the pump are shown. A primary drive gear 170 (FIG. 7) is coupled to the jack shaft 160 by means of a connection pin 172. Jack shaft sprocket 161 and drive chain 162 (FIG. 8) operatively couple the jack shaft with the motor 150. The drive gear 170 will always rotate whenever the motor is in operation. The primary drive gear 170 operatively engages adjacent pump drive gears 144 which act as idlers until clutched (when selected according to the beverage ordered) by clutches 146 to rotate the respective shafts 100 of the pump mechanisms to drive the respective pumps 90 (FIGS. 5 and 6) according to the beverage that is being prepared. Spacers or idlers 172 are provided between the pump drive gears 144 (only one shown in FIG. 12) because of the dimensions of pumps 90 (see FIG. 4). The idlers 172 also cause the various gears 144 to rotate in the same direction. In a preferred embodiment, six peristaltic pumps 90 are driven by jack shaft 160. It will be understood by those skilled in the art, however, that additional peristaltic pumps could be driven by a single jack shaft or by additional jack shafts, as desired.

FIG. 9 shows the inlet line or tube array 180 which supplies one of the selected foodstuffs 130 (FIG. 6) from one of the plurality of holding trays 82 (FIG. 4) to the blending container or jar 25. The foodstuffs supply tube array 180 comprises a plurality of individual tubes 182 which have a plurality of inlet tube ends or openings 184 which are operatively connected to the tube section 140 (FIG. 6) utilized in connection with the various peristaltic pumps 90. Each of the tubes 182 in the tube array 180 begin at wall 122 (FIGS. 1 and 6) and extend upward and through the main horizontal shelf 27, which separates the refrigerated cabinet and the upper processing location 24 and cleaning location 26. Above the shelf 27, the tube array 180 extends above the container 25 at input area 186 for dispensing selected foodstuffs into the open end of blending container 25 placed in the processing area 24. Depending on which type of beverage is ordered, one or more of the plurality of tubes 182 will be utilized to direct drink mix or foodstuffs to the container 25 for blending or processing. A water line 176 (FIGS. 4 and 8) also introduces water directly into the blending container 25 upon demand by a suitable solenoid valve.

Figure 10:
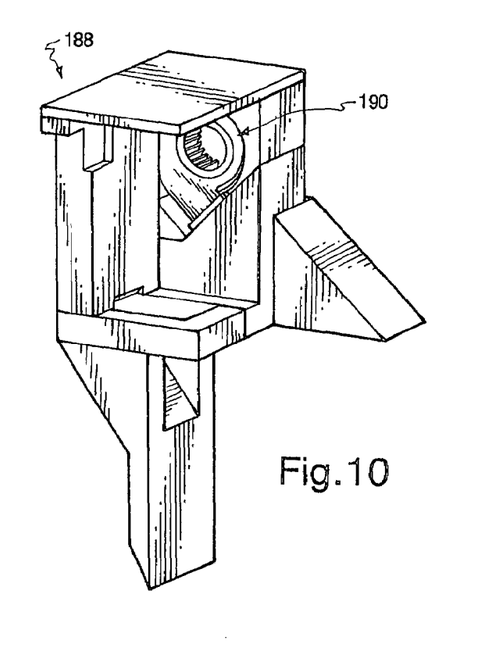
FIG. 10 is a perspective view of a recirculating refrigeration system duct for the foodstuffs supply tube array utilized in connection with the blending station apparatus according to the present invention.
Figure 11:
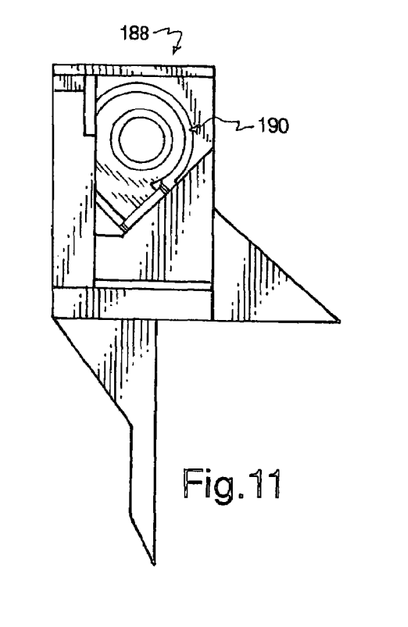
FIG. 11 is a front view of the recirculating refrigeration system of FIG. 10.

FIGS. 10–13 show a configuration of combined insulation and duct work assembly 188 intended to be mounted over the tube array 180 (FIGS. 8 and 9) and the inlet area 186 above the level of the main shelf 27. The assembly 188 creates a plenum for drawing air from and returning air to the refrigerated cabinet associated foodstuffs storage location. It is to be understood that FIGS. 10–13 show open areas of the recirculating refrigeration system duct (e.g., a panel has been removed so that the fan 190 is visible in FIGS. 10 and 11). An insulated panel is intended to cover the area where the fan 190 is shown in FIGS. 10 and 11 to create the plenum. Those skilled in the art will understand that the configuration of the recirculating refrigeration system duct 188 is intended to accommodate a specific embodiment relative to the present invention, and that any other desired configuration and shape may be utilized without departing from the scope of the present invention.

Below the shelf level 27, the tubes 182 are exposed to refrigerated air from the refrigerated cabinet where the storage area 28 is designed to hold the various trays 82 (FIG. 1) which hold the containers of foodstuffs. The refrigerated cabinet maintains the foodstuffs, both in the storage containers and in the tubes, at a temperature that will be acceptable from a food storage standpoint. Above the main, horizontal shelf 27 (FIG. 9), however, the tube array 180 is no longer held within the refrigerated cabinet. Thus, the insulation and duct work assembly 188 allows air from the refrigerated cabinet area to flow around the tube array which extends above shelf 27. As noted in FIGS. 10–13, a circulation fan 190 circulates the refrigerated air from the cabinet associated with the foodstuffs storage location (FIG. 2) so that it surrounds and maintains cool the tube array 180 and so that a more consistent refrigeration temperature is maintained.

FIG. 9 also shows the jar cleaning area 26, which forms a part of the present invention. A grate 192 will cover a sloped bottom surface 194 of the cleaning area 26 during operation. A drain channel 196 extends from the processing area 24 to allow all spillage and other liquid resulting from blending or processing to drain into the cleaning area 26. The bottom surface 194 of the cleaning area 26 slopes toward a drain 198 which is, in turn, operatively coupled to a drain external to the blending station apparatus. An inlet aperture 200 is provided at the bottom wall 194 of the cleaning area 24 for directing pressurized hot water into a jar 25 turned upside down for cleaning. A sensor switch 202 is actuated upon placing a dirty jar 25 into the cleaning area 26. Thereafter, a solenoid valve (not shown) is actuated to allow pressurized hot water to rinse the inside of the jar 25 for an appropriate amount of time.

FIG. 9 further shows a additional foodstuffs supply storage area 210 and corresponding shoot or passageway 212 disposed directly above the blending container 212. Here, dry-mix foodstuffs may be added to the blending container. Such dry-mix foodstuffs include, without limitation, all types of candy mix-ins, dietary supplements, and the like. Multiple such dry-mix foodstuffs storage and supply devices may be operatively coupled to the blending station apparatus as desired.

In operation, when a particular beverage is desired, a blending container or jar 25 is placed inside of the processing area 24. A drink is ordered by entering the appropriate data and other information (e.g., drink size and flavor) into the touch pad 210, which is operatively coupled to a suitable internal data processing device. Alternatively, the blending station apparatus 20 may be operatively coupled to a cash register or other data input device used for taking beverage orders. Once the beverage order is entered into the input device or cash register, the process for preparing the beverage may be automatically initiated.

Upon receipt of the input information, one or more of the various clutches 146 (FIG. 12) are automatically actuated to drive the respective pump(s) 90 for an appropriate amount of time to direct foodstuffs from the various storage containers held in trays 82 (FIG. 2) through the tube array 180 (FIGS. 8 and 9) and into the mixing jar 25. An appropriate amount of chipped ice from the ice chipper 42 (FIGS. 3 and 4) is automatically directed into the jar 25 as well as water from an inlet (not shown, but located above the blending container 25 when positioned inside the processing area 24) which supplies water to the interior of jar 25, according to the selected beverage. An additional novel aspect of the present invention is that a blending station apparatus 20 may be set up to measure the temperature of the water being introduced into the mixing container at water inlet 176 (FIGS. 4 and 8), and the amount of ice that is introduced into the jar 25 will vary based upon the temperature of the water. This portioning of the ice allows the blending station apparatus 20 to achieve a desirable consistency of the beverage irrespective of the temperature of the water being introduced into the jar 25. For example, the water temperature in a relatively cold climate may be much lower than the water temperature at a relatively warmer climate. The blending station apparatus according to the present invention will measure the water temperature and portion the ice accordingly.

After the beverage ingredients have been added to the jar 25, a blending motor 168 is actuated to rotate a conventional blade rotatably secured inside the jar 25 to blend the contents within the jar 25. After appropriate blending has taken place, the contents of the jar are emptied into a beverage receptacle (not shown) for consumption. After the jar 25 has been used, it is inverted and placed within the cleaning area 26 (FIGS. 1 and 9). Upon actuation of switch 202, the inlet 200 directs pressurized hot water into the interior of the jar for an appropriate amount of time to wash the jar 25. Waste water flows to the drain 198. The jar 25 is then ready for preparation of another beverage.

In compliance with the statute, the invention has been described in language more or less specific as to structural and methodical features. It is to be understood, however, that the invention is not limited to the specific features and methods shown and described, since the present description comprises preferred forms and methods of putting the invention into effect. The invention is, therefore, claimed in any of its forms or modifications with the proper scope of the appended claims appropriately interpreted in accordance with the doctrine of equivalents.

The invention claimed is:

1. A blending apparatus, comprising:
   a blending container;
   an ice processor to selectively and automatically introduce ice to the blending container upon request;
   at least one foodstuffs pump to selectively and automatically introduce foodstuffs to the blending container upon request;
   wherein the ice processor and the at least one foodstuffs pump are both driven by a single motor shaft.

2. A blending apparatus according to claim 1 wherein the ice processor comprises:
   at least one auger;
   an ice chipper.

3. A blending apparatus according to claim 1 wherein the ice processor comprises:
   at least one auger;
   an ice chipper;
   wherein the at least one auger and the ice chipper are driven by the single motor shaft.

4. A blending apparatus according to claim 1 wherein the ice processor comprises:
   at least one auger;
   an ice chipper;
   wherein the at least one auger and the ice chipper comprises separate sprockets each driven by the single motor shaft.

5. A blending apparatus according to claim 1 wherein the ice processor comprises:
   at least one auger;
   an ice chipper;
   wherein the at least one auger and the ice chipper are driven at different speeds by the single motor shaft.

6. A blending apparatus, comprising:
   a blending container;
   an ice auger and ice chipper to selectively and automatically introduce ice to the blending container upon request;
   at least one foodstuffs pump to introduce foodstuffs to the blending container upon request;
   a motor having a drive shaft, the drive shaft comprising:
   first, second, and third drive sprockets;
   wherein the first drive sprocket is operatively connected to a jack shaft sprocket, the second drive sprocket is operatively connected to an auger sprocket, and the third drive sprocket is operatively connected to an ice chipper sprocket.

7. A blending apparatus according to claim 6 wherein the jack shaft sprocket is connected to a jack shaft, and the jack shaft selectively drives one or more of a plurality of peristaltic pumps operatively connected to the jack shaft, the plurality of peristaltic pumps each comprising a tube extending to the blending container.

8. A blending apparatus, comprising:
a blending container;
an ice auger and an ice chipper adjacent to the blending container;
at least one foodstuffs pump fluidly connected to the blending container;
a motor having a drive shaft;
wherein the drive shaft is operatively connected to the ice auger, the ice chipper, and the at least one foodstuffs pump.

9. A blending apparatus according to claim 8, further comprising a water line directly connected to the blending container and operated by a solenoid valve.

10. A blending apparatus comprising:
a blending container;
an ice processor to process ice and transport ice to the blending container;
a plurality of ingredients;
at least one pump configured to transport the ingredients to the blending container;
a drive operatively coupled to the ice processor and the at least one pump.

11. A blending apparatus according to claim 10 wherein the ice processor further comprises a chipper to chip apart ice.

12. A blending apparatus according to claim 11 wherein the ice processor further comprises:
an ice hopper capable of storing ice;
an auger disposed to transport ice hopper to the ice chipper.

13. A blending apparatus according to claim 10 wherein the at least one pump comprises a plurality of peristaltic pumps for transporting semi-solid materials.

14. A method for blending ingredients using a single drive system, comprising:
providing a blending container;
chipping ice into substantially smaller dimensions;
transporting chipped ice into the blending container;
pumping selected ingredients into the blending container;
blending the selected ingredients and the chipped ice in the blending container.

15. A method for blending ingredients using a single drive system according to claim 14 wherein the chipping ice into substantially smaller dimensions further comprises:
receiving ice from an ice hopper;
auger the ice towards a chipper;
chipping the ice with the chipper;
wherein the auger and chipping is accomplished by the single drive system.

16. A method for blending ingredients using a single drive system according to claim 14 wherein the pumping selected ingredients into the blending container further comprises:
storing one or more ingredients in separate locations;
selecting one or more of the stored ingredients based on a desired mixture;
pumping the selected ingredients into the blending container.

17. A method for blending ingredients, comprising:
receiving a request for a particular mixture;
providing a blending container;
chipping a selected amount of ice into substantially smaller dimensions with a single drive system, wherein the selected amount of ice is related to the particular mixture requested;
putting the selected amount of chipped ice into the blending container;
pumping selected ingredients into the blending container with the single drive system, wherein the selected ingredients are related to the particular mixture requested;
blending the selected ingredients and the selected amount of chipped ice in the blending container so as to produce a consistent mixture of the particular requested mixture.

18. A blending apparatus comprising:
a blending container;
an ice hopper which is in operative communication with the blending container to allow ice from the ice hopper to move to the blending container;
a plurality of ingredients which are in operative communication with the blending container to allow the plurality of ingredients to move to the blending container; and
a motor configured to drive the movement of the ice from the ice hopper to the blending container and to drive the movement of at least one ingredient from the plurality of ingredients to the blending container.

19. The blending apparatus of claim 18 wherein the motor is configured to simultaneously drive the movement of the ice to the blending container and drive the movement of the at least one ingredient to the blending container.

20. The blending apparatus of claim 18 comprising an ice chipper which is configured to reduce the size of the ice in the ice hopper before the ice enters the blending container.

21. The blending apparatus of claim 18 comprising a cleaning station configured to receive the blending container to allow the blending container to be cleaned.

22. The blending apparatus of claim 18 comprising a cleaning station configured to receive the blending container, the cleaning station including a water source and a drain.

23. The blending apparatus of claim 18 wherein the blending container includes a blade which rotates and is secured inside the blending container.

24. The blending apparatus of claim 18 comprising a refrigeration system which is configured to refrigerate at least one of the plurality of ingredients.

25. The blending apparatus of claim 18 wherein the motor is configured to drive a pump which moves the at least one ingredient to the blending container.

26. The blending apparatus of claim 18 comprising
an ice chipper which is configured to reduce the size of the ice in the ice hopper before the ice enters the blending container;
a cleaning station configured to receive the blending container, the cleaning station including a water source and a drain; and
a refrigeration system which is configured to refrigerate at least one of the plurality of ingredients.

* * * * *